(12) United States Patent
Toy

(10) Patent No.: US 12,166,644 B2
(45) Date of Patent: Dec. 10, 2024

(54) SELF-MANAGED NETWORKS AND SERVICES WITH ARTIFICIAL INTELLIGENCE AND MACHINE LEARNING

(71) Applicant: Verizon Patent and Licensing Inc., Basking Ridge, NJ (US)

(72) Inventor: Mehmet Toy, Allendale, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 560 days.

(21) Appl. No.: 16/868,103

(22) Filed: May 6, 2020

(65) Prior Publication Data

US 2021/0351989 A1 Nov. 11, 2021

(51) Int. Cl.
| | |
|---|---|
| *H04L 41/16* | (2022.01) |
| *G06N 5/04* | (2023.01) |
| *G06N 20/00* | (2019.01) |
| *H04L 45/02* | (2022.01) |
| *H04L 45/302* | (2022.01) |

(52) U.S. Cl.
CPC .............. *H04L 41/16* (2013.01); *G06N 5/04* (2013.01); *G06N 20/00* (2019.01); *H04L 45/08* (2013.01); *H04L 45/302* (2013.01)

(58) Field of Classification Search
None
See application file for complete search history.

(56) References Cited

U.S. PATENT DOCUMENTS

| | | | | |
|---|---|---|---|---|
| RE43,144 E | * | 1/2012 | Creemer | H04L 41/147 709/227 |
| 10,841,173 B2 | * | 11/2020 | Spector | H04L 41/5009 |
| 2007/0195700 A1 | * | 8/2007 | Katoh | H04L 41/5054 370/235 |
| 2009/0312983 A1 | * | 12/2009 | Lee | G06F 11/3466 702/186 |
| 2010/0015926 A1 | * | 1/2010 | Luff | H04L 41/142 455/67.13 |
| 2012/0303413 A1 | * | 11/2012 | Wang | G06Q 30/0202 705/7.31 |
| 2013/0088964 A1 | * | 4/2013 | Towster | H04L 41/147 370/235 |

(Continued)

OTHER PUBLICATIONS

U.S. Appl. No. 16/828,628, filed Mar. 24, 2020 titled "Optimum Resource Allocation and Device Assignment in a MEC Cluster," by Mehmet Toy, 39 pages.

*Primary Examiner* — Gregory B Sefcheck
*Assistant Examiner* — Suk Jin Kang

(57) ABSTRACT

A method, a system, and a non-transitory storage medium are described in which a AI-based self-management network service is provided. The AI-based self-management network service may include AI-based self-routing management, AI-based self-capacity management, and AI-based self-fault and recovery management for a self-managed network and services. The AI-based self-routing management service may calculate predicted utilization values of network resources of a network path, and calculate a predicted path weight based on the predicted utilization values. The AI-based self-fault and recovery management service may refine the identification of probable causes of failures and selection of recovery actions, and generate new probable causes of failures and new recovery actions based on a machine learning model.

20 Claims, 9 Drawing Sheets

(56) References Cited

U.S. PATENT DOCUMENTS

| | | | |
|---|---|---|---|
| 2014/0226485 A1* | 8/2014 | Heinz | H04L 43/16 370/252 |
| 2015/0332145 A1* | 11/2015 | Vasseur | H04L 43/062 706/12 |
| 2016/0037379 A1* | 2/2016 | Shafiee | H04W 28/0226 370/230.1 |
| 2016/0088633 A1* | 3/2016 | Egner | H04W 72/54 455/452.2 |
| 2016/0197847 A1* | 7/2016 | Astley | H04L 47/822 709/226 |
| 2017/0078974 A1* | 3/2017 | Koutsimanis | H04W 52/242 |
| 2017/0079046 A1* | 3/2017 | Egner | H04W 48/18 |
| 2017/0359230 A1* | 12/2017 | Dintenfass | H04L 47/823 |
| 2017/0359245 A1* | 12/2017 | Dintenfass | H04L 43/16 |
| 2018/0024860 A1* | 1/2018 | Balle | G06F 8/65 718/104 |
| 2018/0091383 A1* | 3/2018 | Guim Bernat | H04L 43/0817 |
| 2018/0103123 A1* | 4/2018 | Skog | H04L 69/14 |
| 2018/0109470 A1* | 4/2018 | Buehrer | G06Q 30/0202 |
| 2018/0262924 A1* | 9/2018 | Dao | H04W 24/08 |
| 2018/0302316 A1* | 10/2018 | Ubaldi | H04L 45/302 |
| 2018/0343480 A1* | 11/2018 | Li | H04N 21/254 |
| 2019/0036789 A1* | 1/2019 | Kaplunov | H04L 41/16 |
| 2019/0138934 A1* | 5/2019 | Prakash | G06V 10/7747 |
| 2019/0158606 A1* | 5/2019 | Guim Bernat | H04W 4/40 |
| 2019/0220703 A1* | 7/2019 | Prakash | G06F 18/214 |
| 2019/0236439 A1* | 8/2019 | D | G06F 9/5027 |
| 2019/0268240 A1* | 8/2019 | Yadav | H04W 24/04 |
| 2019/0319868 A1* | 10/2019 | Svennebring | H04L 41/147 |
| 2019/0319881 A1* | 10/2019 | Maskara | H04L 45/74 |
| 2019/0340499 A1* | 11/2019 | Burger | G06N 3/063 |
| 2019/0394655 A1* | 12/2019 | Rahman | H04L 41/145 |
| 2020/0057918 A1* | 2/2020 | Shin | G06N 20/00 |
| 2020/0145506 A1* | 5/2020 | Dintenfass | H04L 67/535 |
| 2020/0154292 A1* | 5/2020 | Bor-Yaliniz | H04W 24/02 |
| 2020/0187055 A1* | 6/2020 | Meredith | H04L 1/08 |
| 2020/0195495 A1* | 6/2020 | Parker | H04L 41/082 |
| 2020/0232802 A1* | 7/2020 | Zhang | G06V 10/82 |
| 2020/0250605 A1* | 8/2020 | Moorthy | G06N 20/00 |
| 2020/0359267 A1* | 11/2020 | Meredith | H04L 1/08 |
| 2020/0379814 A1* | 12/2020 | Blagodurov | G06F 9/5038 |
| 2021/0103820 A1* | 4/2021 | Ghosh | G06N 3/063 |
| 2021/0105228 A1* | 4/2021 | Joseph | H04L 41/147 |
| 2021/0273858 A1* | 9/2021 | Radovanovic | G06Q 50/06 |
| 2021/0303985 A1* | 9/2021 | Lakshmikantha | G06N 3/0445 |
| 2021/0360447 A1* | 11/2021 | Bor-Yaliniz | H04W 28/0284 |
| 2022/0038359 A1* | 2/2022 | Svennebring | H04L 43/08 |
| 2022/0303331 A1* | 9/2022 | Svennebring | H04N 21/8456 |
| 2023/0007520 A1* | 1/2023 | Yao | H04W 24/08 |

\* cited by examiner

SELF-MANAGED NETWORKS AND SERVICES WITH ARTIFICIAL INTELLIGENCE AND MACHINE LEARNING

BACKGROUND

Autonomic or self-managing networks include network elements that can adapt themselves to contextual changes without any external (e.g., human) intervention based on adaptive and flexible functionalities. For example, a self-managed network may identify a network problem and autonomously repair the problem.

DETAILED DESCRIPTION OF PREFERRED EMBODIMENTS

Figure 1:
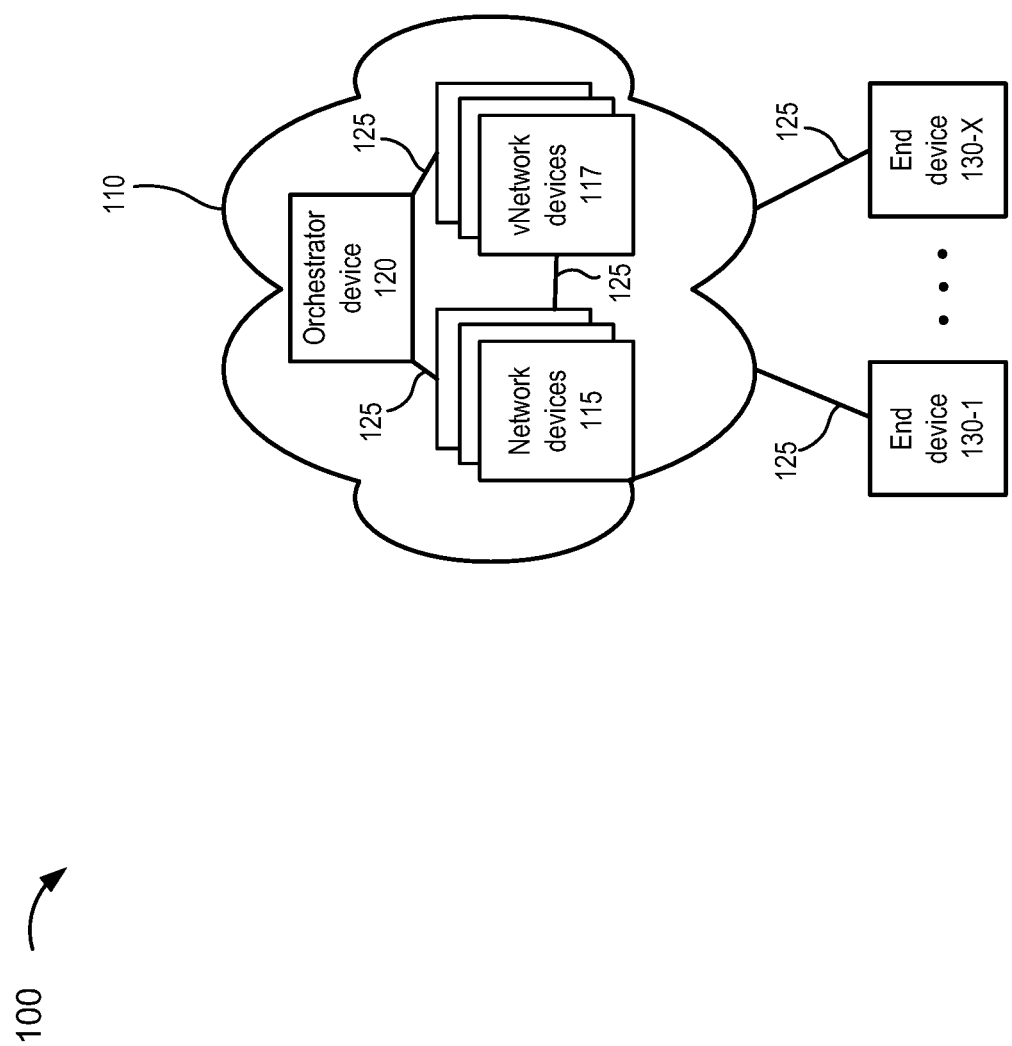
FIG. 1 is a diagram illustrating an exemplary environment in which an exemplary embodiment of an artificial intelligence (AI)-based self-management network service may be implemented.

The following detailed description refers to the accompanying drawings. The same reference numbers in different drawings may identify the same or similar elements. Also, the following detailed description does not limit the invention.

A self-managed network may include self-managing network devices. A network device, a network element, or a network function (referred to herein simply as a network device) may be physical (e.g., non-virtual) or virtual, for example. The self-managed network may provide various services, such as routing, fault and recovery management, capacity management, and other types of network-related services. However, the development of self-managed networks is on-going due to the inherent complexities associated with the network devices, end devices and/or users services (e.g., application services, etc.).

According to exemplary embodiments of the present disclosure, an artificial intelligence (AI)-based self-management network service is described. According to an exemplary embodiment, the AI-based self-management network service may include AI-based self-routing management, AI-based self-capacity management, and AI-based self-fault and recovery management for a self-managed network and services. According to various exemplary embodiments, the AI-based self-management network service may be used in various types of networks, such as a non-virtual network, a virtual network, a network that includes a non-virtual network and a virtual network, and other types of network architectures. According to various exemplary embodiments, the AI-based self-management network service or a sub-service thereof (e.g., the AI-based self-routing management service, etc.) may be implemented in a centralized or a distributed manner, as described herein. According to exemplary embodiments of the AI-based self-management network service, a self-managed network and services that ride over the network (e.g., a network layer and above) may include AI-based self-routing capabilities and other AI-based capabilities, as described herein.

According to an exemplary embodiment, the AI-based self-routing management service may calculate weights for network devices and communication links that constitute a network path between end devices/users. The weights may relate to one or multiple criteria, such as path utilization, delay, packet loss, jitter, and/or other types of performance metrics. The calculation of the weights may include the use of threshold values, as described herein. According to an exemplary embodiment, the AI-based self-routing management service may use AI-based analytics (e.g., machine learning (ML), etc.) that may calculate and update weights associated with network paths based on measurement data received, as described herein.

According to an exemplary embodiment, the AI-based self-routing management service may select the network path based on weights associated with the network path. The AI-based self-routing management service may also consider service level agreements (SLAs), selection of most important performance metric, and other factors, as described herein. According to an exemplary embodiment, a network of the AI-based self-routing management service may include at least two disjoint paths between end device locations.

According to an exemplary embodiment, the AI-based self-capacity management service may calculate an estimate or a prediction of utilization for a network resource of a network path. For example, the network resource may relate to a communication link and/or a network device (e.g., virtual, non-virtual). By way of further example, the network resource may relate to a processor, a memory, a storage device, a communication interface, bandwidth, and so forth, which may be virtual or non-virtual. The AI-based self-capacity management service may calculate a future weight for a network path based on future utilization values relating to the communication link and the network device. According to an exemplary embodiment, the AI-based self-capacity management service may obtain or learn coefficients of a set of linear equations for predicting the future utilization value relating to the network resource, as described herein.

According to an exemplary embodiment, the AI-based self-fault and recovery management service may identify failures of virtual/non-virtual network devices (or virtual/non-virtual components thereof) and/or virtual/non-virtual communication links and recovery actions. The AI-based self-fault and recovery management service may use machine learning analytics to learn new failure incidents and corresponding recovery actions, as well as refine known or learned failures and recovery actions, as described herein.

In view of the foregoing, an AI-based self-managed network and services framework may drastically reduce operational costs due to automation, improve the utilization of resources of the network, applications, and end devices, and support various parameters of network performance metrics and quality of service (QoS) simultaneously, and other factors that may necessarily flow therefrom.

FIG. 1 is a diagram illustrating an exemplary environment 100 in which an exemplary embodiment of the AI-based self-management network service may be implemented. As illustrated, environment 100 includes a network 110. Network 110 may include network devices 115, virtual network devices 117, and an orchestrator device 120. Environment 100 further includes end devices 130.

The number, the type, and the arrangement of network devices in network 110, as illustrated and described, are exemplary. According to other exemplary embodiments, network 110 may not include network devices 115 or virtual network devices 117. Additionally, or alternatively, environment 100 may include multiple orchestrator devices 120 (e.g., main orchestrator, regional orchestrators, etc.).

The number of end devices 130 is exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

Environment 100 includes communication links 125 between network devices, and between end devices 130 and network 110. Environment 100 may be implemented to include wired, optical, and/or wireless communication links. A communicative connection via communication link 125 may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links 125 illustrated in environment 100 are exemplary.

Environment 100 may include various planes of communication including, for example, a control plane, a user plane, a service plane, and/or a network management plane. Environment 100 may include other types of planes of communication. A message communicated in support of the AI-based self-management network service may use at least one of these planes of communication. According to various exemplary implementations, the interface of the network device may be a service-based interface, a reference point-based interface, an Open Radio Access Network (O-RAN) interface, or some other type of interface.

Network 110 may include one or multiple networks of one or multiple types of technologies. For example, network 110 may include an access network, a core network, a fronthaul network, a backhaul network, an application layer network, a private network, a public network, a wide area network (WAN), a local area network (LAN), a municipal area network (MAN), a wireless network, a wired network, an optical network, a virtualized network, and/or another type of communication network. By way of further example, network 110 may include a radio access network (RAN), a cellular network, a television network, a data network, a service provider network, a multi-access edge computing (MEC) network, a data center, a cloud network, a Carrier Ethernet network, a packet-switched network, or other type of network. According to an exemplary embodiment, network 110 provides the AI-based self-management network service, as described herein.

Network devices 115 may include various types of network devices depending on the type and/or technology of network 110. For example, network devices 115 may include wireless network devices, wired network devices, optical network devices, routers, switches, bridges, repeaters, hubs, RAN devices (e.g., next generation Node B (gNB), evolved Node B (eNB), or other type of wireless station), core devices (e.g., user plane function (UPF) device, packet gateway (PGW) device, or other network device of a Fifth Generation (5G) core network, a Fourth Generation/Long Term Evolution (LTE) network, etc.), servers, gateways, television network devices, Internet network devices, telephone network devices, aggregators, multiplexers, security devices, authentication devices, and/or other types of network devices that may be complementary of the type and/or technology of network 110.

According to an exemplary embodiment, network devices 115 may include logic that provides and/or supports the AI-based self-management network service or a sub-service (e.g., AI-based self-routing management service, etc.) thereof. For example, network devices 115 may include agents or slaves, for example, that provide and/or supports the AI-based self-management network service or the sub-service. According to some exemplary embodiments, the agents or slaves may co-operate with orchestrator 120. According to other exemplary embodiments, the agents or slaves may provide the AI-based self-management network service or the sub-service locally, which may or may not involve orchestrator 120 (e.g., a centralized or main orchestrator, a regional orchestrator, etc.). Additionally, for example, according to some exemplary embodiments, only select network devices 115 may include the agents or the slaves for a sub-service. For example, with respect to the AI-based self-routing management service, network edge devices 115 may include the agents or the slaves of this service.

Virtual network devices 117 may include various types of network devices similar to network devices 115 but are virtualized. Virtual network devices 117 may be implemented using one or multiple virtualization technologies, such as a hypervisor, a host, a container, a virtual machine (VM), a network function virtualization infrastructure (NFVI), a network function virtualization orchestrator (NFVO), a virtual network function manager (VNFM), a virtualized infrastructure manager (VIM), a platform manager and/or other types of virtualization elements (e.g., virtual network function (VNF), etc.), layers, hardware resources, operating systems, software resources, engines, etc.

According to an exemplary embodiment, virtual network devices 117 may include logic that provides and/or supports the AI-based self-management network service or a sub-service thereof. For example, virtual network devices 117 may include agents or slaves that provide and/or support the AI-based self-management network service or the sub-service. According to some exemplary embodiments, the agents or slaves may co-operate with orchestrator 120. According to other exemplary embodiments, the agents or slaves may provide the AI-based self-management network service or the sub-service locally, which may or may not involve orchestrator 120 (e.g., a centralized or main orchestrator, a regional orchestrator, etc.). Additionally, for example, according to some exemplary embodiments, only select virtual network devices 117 may include the agents or the slaves for a sub-service. For example, with respect to the AI-based self-routing management service, virtual network edge devices 117 may include the agents or the slaves of this service.

Orchestrator device 120 may include a network device that provides the AI-based self-management network service or a sub-service. According to an exemplary embodiment, orchestrator 120 may generate and communicate AI-based self-routing information, AI-based self-capacity information, and/or AI-based self-fault and recovery information to network devices 115 and virtual network devices 117, as described herein. According to an exemplary embodiment, orchestrator 120 may include machine learning models, for example, to generate the AI-based self-routing information, the AI-based self-capacity information, and/or the AI-based self-fault and recovery information.

End device 130 includes a device that has communicative capabilities. Depending on the implementation, end device 130 may be a mobile device, a portable device, a stationary device, a device operated by a user (e.g., UE, etc.), a device not operated by a user (e.g., an Internet of Things (IoT) device, etc.), a virtual device, or not a virtual device. For example, end device 130 may be implemented as a smartphone, a mobile phone, a personal digital assistant, a tablet, a netbook, a phablet, a wearable device (e.g., a watch, glasses, etc.), a computer, a device in a vehicle, a gaming device, a music device, an IoT device, a CPE, a uCPE, a virtual CPE (vCPE), a virtual network demarcation device (vNID) or other type of device (cloud-in-a-box, etc.) or node. End device 130 may be configured to execute various types of software (e.g., applications, programs, etc.). The number and the types of software may vary among end devices 130.

Figure 2:
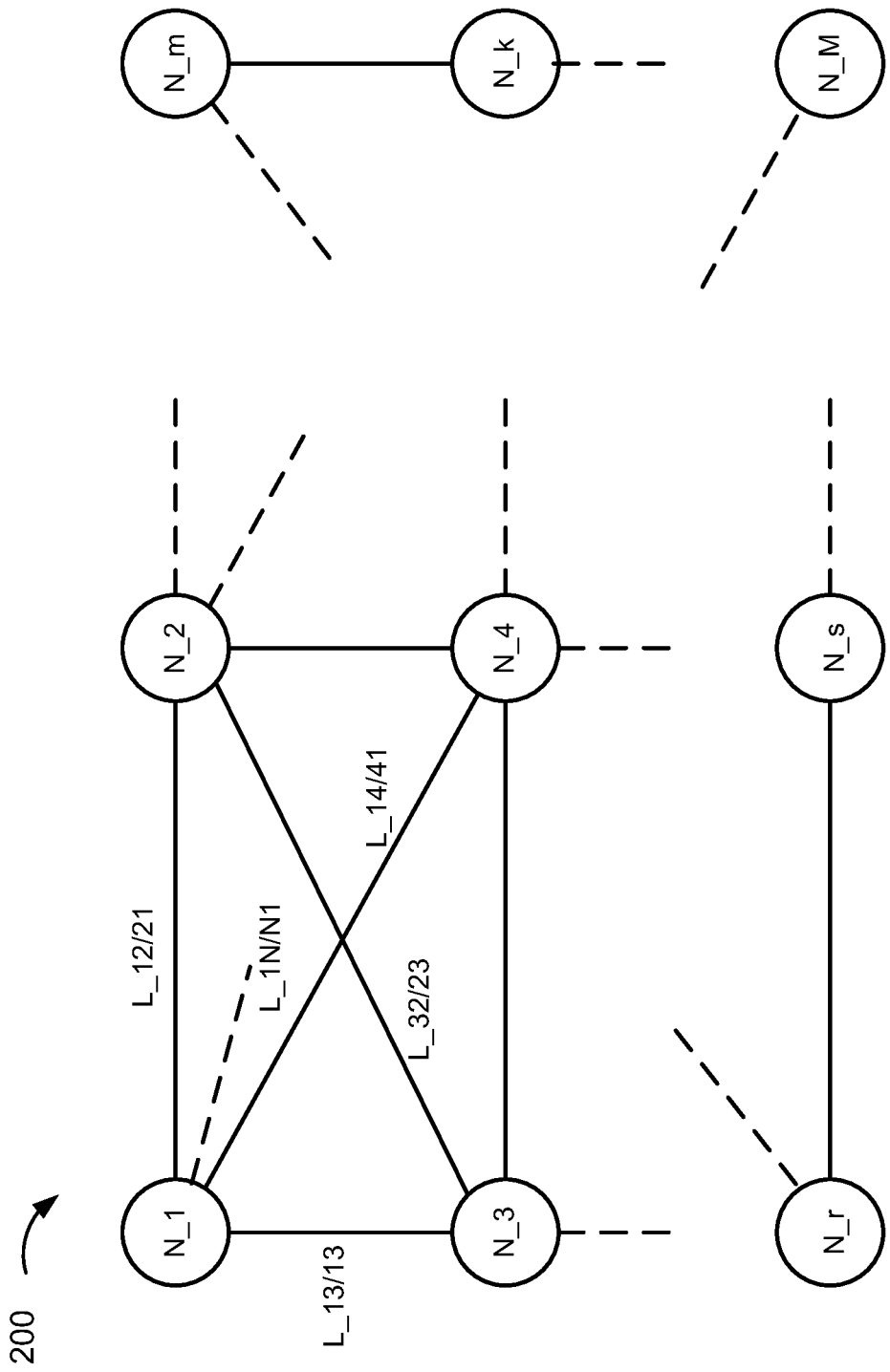
FIG. 2 is a diagram illustrating an exemplary network topology in which an exemplary embodiment of the AI-based self-management network service may be implemented.

FIG. 2 is a diagram illustrating an exemplary network topology 200 in which the AI-based self-routing management service may be implemented. According to other exemplary embodiments, the AI-based self-routing management service may be implemented in other network topologies. For the sake of description, assume network topology 200 is a fully connected network with $M(M-1)/2$ links, which is partially illustrated in FIG. 2. Network nodes (N) may correspond to network devices 115 and/or virtual network devices 117 depicted in FIG. 1, and communication links (L) may correspond to communication links 125 within network 110, as depicted in FIG. 1. Additionally, assume that there is one port per location and each port may have one connection. The term "location," as used herein may refer to, for example, a service area of network device 115 or virtual network device 117 (also referred to as a "node"). For example, a first location may pertain to a network edge device associated with end device 130-1 and a second location may pertain to another (or the same) network edge device associated with end device 130-2. According to another example, a first location may pertain to a network edge device associated with end device 130, and a second location may pertain to a server device that provides an application and/or a service (referred to as an "application service"). For example, the application service may relate to video streaming, a communication service (e.g., voice, texting, etc.), or other types of end device or user applications or services.

For an M node and L link network (which may or may not be fully connected), assume there may be at least two paths between two locations. For example, there may not be just a single path between two nodes. Also, there may be at least two disjoint paths between any two nodes.

According to an exemplary embodiment, the AI-based self-routing management service may calculate a connectivity weight between two nodes of given locations. For example, the connectivity weight may have a value of 0 when there is no path, a value of 1 when there is a single path, a value of 2 when there are 2 paths, and so forth. By way of further example, if there are 3 paths and each path may have a weight of 1, then the connectivity weight would be 3.

According to an exemplary embodiment, the weight of a path may be calculated based on the utilizations of nodes and link(s) of the path. For example, with reference to FIG. 2, a path between $N\_1$ and $N\_2$, the path utilization may be calculated based on the utilizations of $N\_1$ and $N\_2$ and $L\_12/21$. According to another example, for a path of L links and M nodes, the path utilization may be calculated according to the exemplary expression:

$$\text{Path Utilization} = \text{Maximum}((\text{Utilization of } L\_1 \ldots \text{Utilization of } L\_L), (\text{Utilization of } N\_1 \ldots \text{Utilization of } N\_M)) \quad (1).$$

For example, according to expression (1), the maximum utilization value of a node from among multiple nodes of a network path may be selected as the path utilization value for node resource. Similarly, the maximum utilization value of a communication link from among multiple communication links in the network path may be selected as the path utilization value for communication link resource. According to other implementations, the path utilization value may be an average utilization value based on an averaging of the utilization values of the nodes in the network path. Similarly, an average of the utilization values of communication links may be calculated and constitute the path utilization value for communication links of the network path.

According to an exemplary embodiment, a path utilization may be compared to a threshold value. For example, for a path to have a weight of 1, all the utilization values for the nodes and links of a path may be compared to a threshold value (e.g., $\leq \Phi$) to determine if they satisfy the threshold value. $\Phi$ may be set to a fixed value, such as 0.7 or another suitable value. According to another example, if the path utilization is between a first threshold value (e.g., $\Phi$) and a second threshold value (e.g., $\Omega$) (e.g., $\Phi < \text{path utilization} < \Omega$), the weight of the path may be set to 0.5. $\Omega$ may be set to a fixed value, such as 0.9 or another suitable value. According to yet another example, if the path utilization is greater than $\Omega$, the weight of the path may be 0. According to other exemplary implementations, the number of threshold values and their respective numerical values may be different. According to an exemplary implementation, the weight for a path may be within a normalization range of 0 to 1. According to other exemplary implementations, other ranges of values indicating the path weight may be used.

According to an exemplary embodiment, based on the path utilization value (e.g., expression 1) and threshold values, a path weight of a path may be calculated. For example, orchestrator 120 or, network device 115 or virtual network device 117 may calculate the path weight. Node and link utilization measurements may be performed periodically, on-demand, and/or according to a triggering event (e.g., congestion level, etc.). For a given service connection between two locations, the AI-based self-routing management service may select the path with the best path utilization. For example, for an Ethernet Virtual Connection (EVC), a Cloud VC, or other type of service connection (e.g., virtual or non-virtual) or application session between two locations, the path with the largest weight may be selected.

According to various exemplary embodiments, the AI-based self-routing management service may use other factors in selecting the best path. For example, the AI-based self-routing management service may select the best path based on one or multiple performance metrics of the path. For example, the performance metric may relate to delay, packet loss, jitter, throughput, or other metric (e.g., Quality of Service (QoS) parameter, Quality of Experience (QoE) score, Mean Opinion Score (MOS), Key Performance Indicator (KPI), etc.). The AI-based self-routing management service may calculate one or multiple metric values for each candidate path. The AI-based self-routing management service may also ensure that application service level agreement (SLA) criteria are satisfied by a selected path. In the event that there are more than one best path (e.g., two or more paths that have the same weight or satisfy a minimal threshold), the AI-based self-routing management service may randomly select the best path from among the candidate best paths, or select the best path based on a most important metric associated with an application service that is using the path. Exemplary expressions to calculate a metric are provided below.

With reference to the calculation of delay of a path, the delay may be calculated based on the delays associated with the nodes and links of the path. For example, for a path of L links and M nodes, the path delay may be calculated according to the following exemplary expression:

$$\text{Path delay} = \sum_{i=1}^{L} \text{Link\_delay} + \sum_{j=1}^{M} \text{Node\_delay}, \quad (2)$$

in which the path delay may be an end-to-end one-way delay. According to other examples, the path delay may be a round-trip delay.

With reference to the calculation of packet loss of a path, the packet loss may be calculated based on the packet losses associated with the nodes of the path. For example, for a path of M nodes, the packet loss of a path may be calculated according to the following exemplary expression:

$$\text{Packet loss} = \sum_{j=1}^{M} \text{Node\_packet\_loss}. \quad (3)$$

The AI-based self-routing management service may select the path with the lowest delay among candidate paths that satisfy the delay required by the SLA. When there is no available path that satisfies the delay requirement, the AI-based self-routing management service may reject the service connection or provide a degraded mode of service based on a service policy associated with the path. Also, when there may be multiple candidate paths that satisfy the SLA delay requirement, the AI-based self-routing management service may randomly select the path from among the candidate paths, or also consider other metrics (e.g., packet loss) and/or select the highest weight of the most important metric (e.g., which may not include delay) associated with the service connection/application service.

Similarly, the AI-based self-routing management service may select the path with the lowest packet loss among candidate paths that satisfy the SLA packet loss requirement. Additionally, when there is no available path that satisfies the packet loss requirement of the SLA, the AI-based self-routing management service may reject the service connection or provide a degraded mode of service based on a service policy associated with the path. Also, when there may be multiple candidate paths that satisfy the SLA packet loss requirement, the AI-based self-routing management service may randomly select the path or perform similar operations as described herein in relation to delay.

Figure 3:
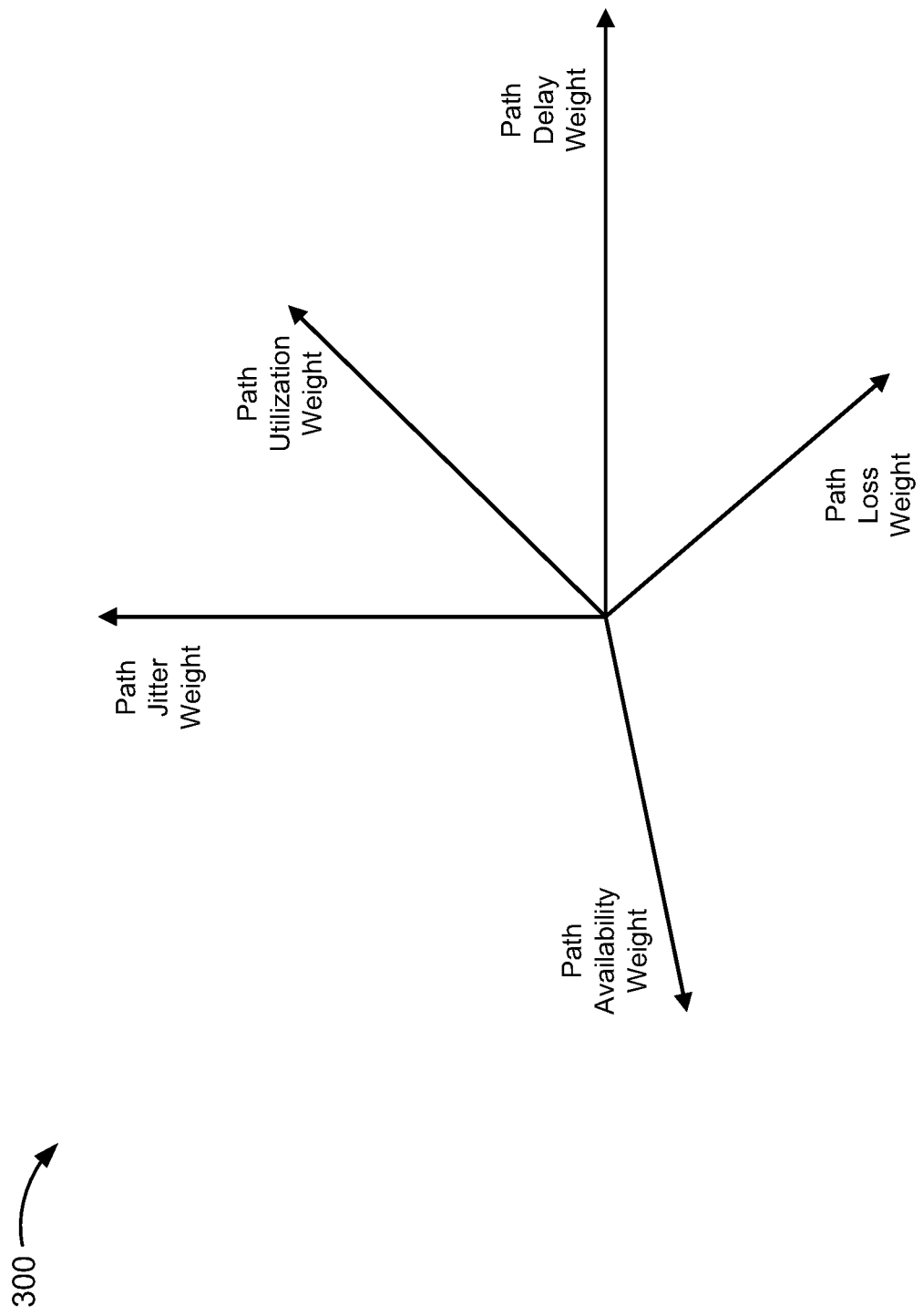
FIG. 3 is a diagram illustrating exemplary weights of a network path associated with an exemplary embodiment of the AI-based self-management network service.

FIG. 3 is a diagram illustrating exemplary weights 300 of a path that may be calculated and considered when selecting the best path. For example, the weights 300 may relate to jitter, utilization, delay, packet loss, and availability. According to other examples, weights 300 may relate to a link type (e.g., wired, wireless, optical, etc.), distances, and/or geographical locations. According to still other examples, weights 300 may relate to additional, different, and/or fewer weights of a path.

According to an exemplary embodiment, the AI-based self-routing management service may generate and store AI-based self-routing information. The AI-based self-routing information may be stored in various data structures (e.g., tables, etc.) or database. As described below, the AI-based self-routing information may include path information associated with locations. The representation of this information as described below is exemplary.

As illustrated below, there are location vectors 1 and 2 and a Path Matrix. Assume there are M nodes in the network. Also, p_ij=p_ji in which i=1, 2 . . . M; j=1, 2, . . . M, which assumes the paths are bidirectional and the path weights in both incoming and outgoing directions are the same. According to other embodiments, path weights may be different for each direction and the AI-based self-routing information may store additional information on a per direction basis.

$$\begin{pmatrix} loc\_1 \\ loc\_2 \\ loc\_3 \\ \cdot \\ \cdot \\ \cdot \\ loc\_M \end{pmatrix} = \begin{bmatrix} 0 & p12 & p13 & \ldots & p1M \\ p21 & 0 & p23 & \ldots & p2M \\ p31 & p32 & 0 & \ldots & p3M \\ \cdot & \cdot & \cdot & \ldots & \cdot \\ \cdot & \cdot & \cdot & \ldots & \cdot \\ \cdot & \cdot & \cdot & \ldots & \cdot \\ pM1 & \cdot & \cdot & \ldots & 0 \end{bmatrix} \begin{pmatrix} loc\_1 \\ loc\_2 \\ loc\_3 \\ \cdot \\ \cdot \\ \cdot \\ loc\_M \end{pmatrix}$$

Location Vector 1     Path Matrix     Location Vector 2

The entries in the Path Matrix relate to paths. For example, given loc_1 of location vector 1 and loc_1 of location vector 2, the path is 0 (e.g., the same locations), which is illustrated in the top row of the Path Matrix. Also, for example, given loc_1 (of location vector 1) and loc_2 (of location vector 2), the path is p_12, which is illustrated in the top row of the Path Matrix. Thus, the paths for loc_1 to loc_1 through M, the paths may be found in the top row of the Path Matrix. Although not illustrated, the Path Matrix may include multiple paths between locations (e.g., loc_1 to loc_2). Similarly, for loc_2 (of location vector 1) and loc_1 (of location vector 2), the path is p_21, the path between loc_2 (of location vector 1) and loc_2 (of location vector 2) is 0, and so forth.

According to an exemplary embodiment, the AI-based self-routing management service may generate and store path weight information. The representation of this information as described below is exemplary. The values are also exemplary.

$$\begin{pmatrix} loc\_1 \\ loc\_2 \\ loc\_3 \\ . \\ . \\ . \\ loc\_M \end{pmatrix} = \begin{bmatrix} 0 & 0.5 & 1 & \ldots & 0 \\ 0.5 & 0 & .43 & \ldots & 1 \\ 1 & .8 & 0 & \ldots & 1 \\ . & . & . & \ldots & . \\ . & . & . & \ldots & . \\ . & . & . & \ldots & . \\ 1 & . & . & \ldots & 0 \end{bmatrix} \begin{pmatrix} loc\_1 \\ loc\_2 \\ loc\_3 \\ . \\ . \\ . \\ loc\_M \end{pmatrix}$$

Location Vector 1    Path Weight Matrix    Location Vector 2

The entries in the Path Weight Matrix relate to path weights. For example, given loc_1 of location vector 1 and loc_1 of location vector 2, the path weight is 0, which is illustrated in the top row of the Path Weight Matrix. The path weights relative to locations of location vector 1 and locations of location vector 2 may have a similar mapping as that described in relation to the Path Matrix. Additionally, although not illustrated, the Path Weight Matrix may include multiple path weights between locations relating to multiple paths. Further, as described herein, the AI-based self-routing management service may select the best path based on one or multiple performance metrics of the path. In this regard, the entries in the Path Weight Matrix may also include performance metric values relating to a path. Alternatively, one or multiple dedicated Path Metrix Matrices may be generated that map one or multiple metric values to a path associated with locations.

According to an exemplary embodiment, the AI-based self-capacity management service may calculate future utilization values for network resources, such as network devices 115, virtual network devices 117, and communication links 125 of network 110. According to an exemplary embodiment, the AI-based self-capacity management may use an ML prediction algorithm to estimate future utilization values. Based on the estimated future utilization values, the AI-based self-capacity management service may calculate future weights for a given path.

According to an exemplary embodiment, the AI-based self-capacity management may calculate future utilization values for network resources based on techniques disclosed in U.S. patent application Ser. No. 16/828,628, filed Mar. 24, 2020 and titled "Optimum Resource Allocation and Device Assignment in a MEC Cluster," which is incorporated by reference in its entirety herein.

According to an exemplary embodiment, orchestrator 120 may obtain resource utilization data and performance data for network devices 115, virtual network devices 117, and communication links 125 in network 110. This data may be stored and updated (e.g., periodically, according to a schedule, on-demand, trigger event, etc.). For example, for network devices 115 and virtual network devices 117, the data may include a network device identifier that identifies network device 115 or virtual network device 117, timestamp information that indicates a time or period of time at which the resource or performance parameter value is measured or relates to, and utilization values relating to different types of network resources, such as hardware utilization (e.g., processor, memory, storage, communication interface (e.g., buffer, port, or the like, etc.). Depending on the network device, the hardware utilization values may relate to virtual hardware (e.g., virtual central processing unit (vCPU)) or non-virtual hardware (e.g., CPU). The utilization values may be expressed as a percentage of total (e.g., 50% of vCPU utilization) or in other suitable unit of measurement. Similarly, the data for communication link 125 may include a communication link identifier that identifies communication link 125, timestamp information that indicates a time or a period of time at which the resource or performance parameter value is measured or relates to, and resource utilization relating to communication link 125 (e.g., bandwidth).

According to an exemplary embodiment, the data may also include performance metric data. For example, the performance metric values may relate to delay, packet loss, and other metrics as described herein. The performance metric values may also relate to a network path.

Orchestrator device 120 may select the calculated future utilization values associated with network devices (virtual and/or non-virtual) and communication links 125 of relevance to a network path, and may calculate a future path utilization value based on expression (1). Similarly, orchestrator device 120 may also calculate delay or packet lost based on expressions (2) and (3), as well as other types of future metric values based on performance metric values of a network path and predictive techniques.

Figure 4:
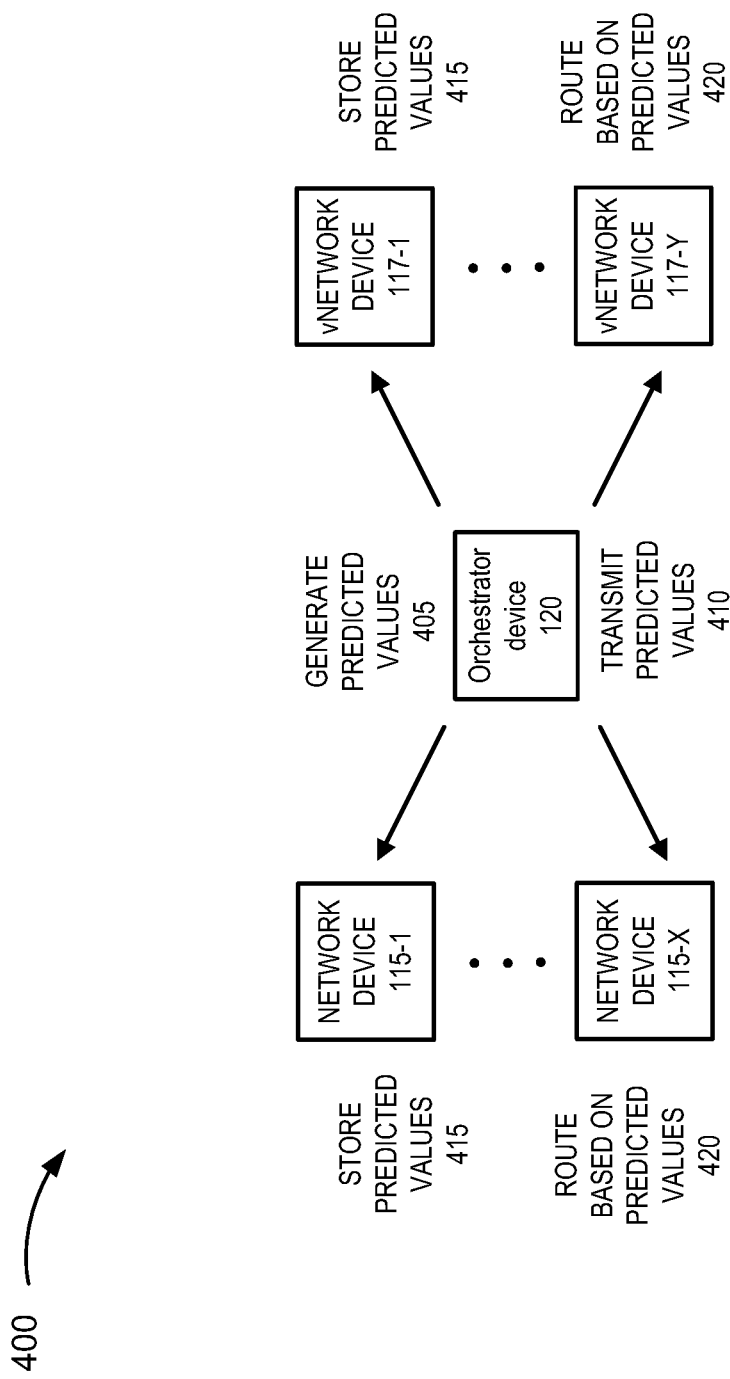
FIG. 4 is a diagram illustrating an exemplary process of an exemplary embodiment of the AI-based self-management network service.

FIG. 4 is a diagram illustrating an exemplary process of the AI-based self-capacity management service. As illustrated, based on resource and performance data received, orchestrator device 120 may generate predicted values 405, such as future path weights or future performance metric values. Orchestrator device 120 may transmit (e.g., download) the predicted values 410 to network devices 115 and/or virtual network devices 117 of relevance to the network path to which the predicted values pertain. Network devices 115 and virtual network devices 117 may store the predicted values 415 and make routing decisions based on the predicted values 420. In this way, routing of traffic may be performed with minimal delay, without added delays by way of communication between network devices 115 and virtual network devices 117 with orchestrator device 120 to provide real-time updates of path weights and performance metrics relating to network paths.

According to an exemplary embodiment, the AI-based self-fault and recovery management service may identify a probable cause of a failure and a possible recovery action. For example, for network devices 115, the AI-based self-fault and recovery management service may identify a probable cause of failure for each network device or node type (or a component type in each network device or node).

Additionally, for example, for virtual network devices 117, the AI-based self-fault and recovery management service may identify a probable cause of failure for each application and infrastructure layer (e.g., operating system (OS) and hardware) of the virtual network device.

Figure 5:
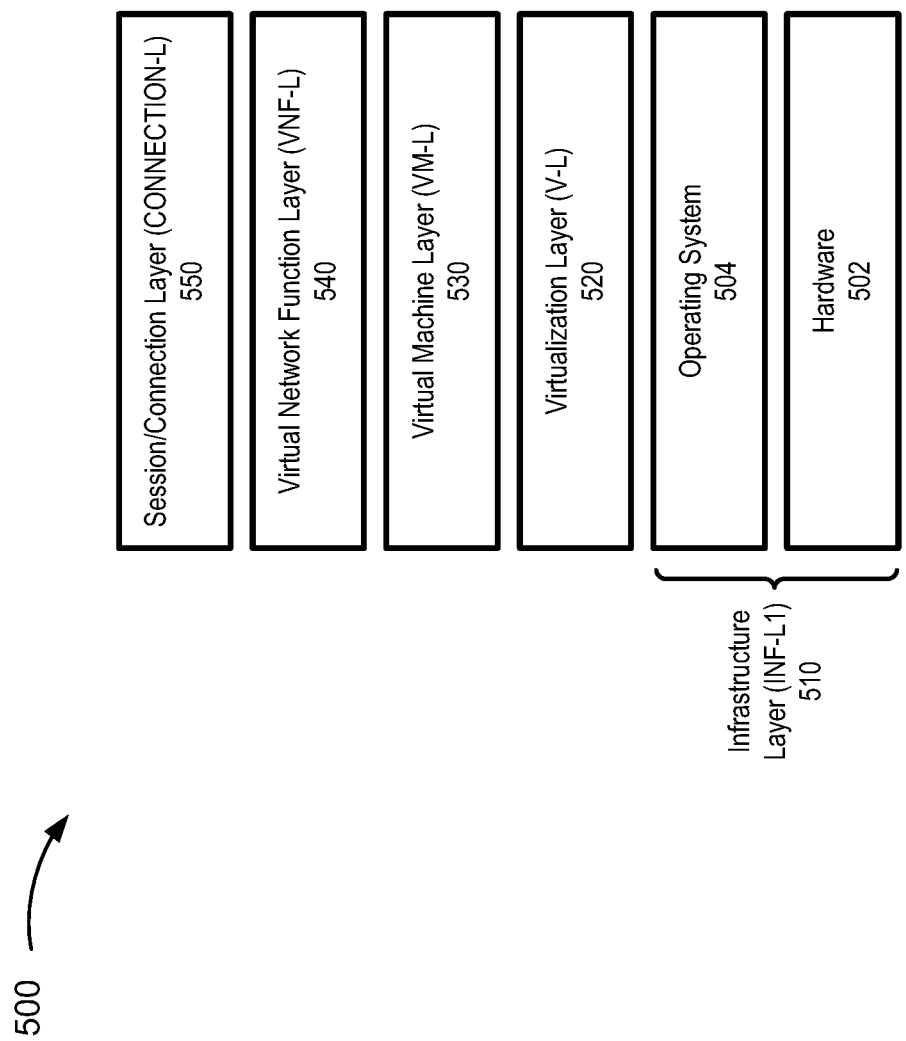
FIG. 5 is a diagram illustrating exemplary components of a virtualized system.

FIG. 5 is a diagram illustrating an exemplary layer framework for virtual network device 117. Beginning with the bottom layer of the virtualized system 500, hardware layer 502 of infrastructure layer (INF-L1) 510 may include logic that detects a failure in hardware, such as a CPU, a memory, physical interfaces, a small form-factor pluggable (SFP), etc.; generates a trap or other type of message (e.g., a fault or interrupt that initiates a context switch to a monitor program or debugging function) and forwards the trap or the message to another network device (e.g., orchestrator device 120); and switches over from a failed primary hardware unit/system to a secondary unit/system or vice-versa.

Operating system layer 504 of INF-L1 510 may include logic that detects failures in the OS; generates a trap/message and forwards the trap/message to another network device (e.g., orchestrator device 120; and switches over from a failed primary OS unit/system to a secondary unit/system or vice-versa.

Virtualization layer 520 may include logic that detects a failure in a hypervisor; generates a trap/message and forwards the trap/message to another network device (e.g., orchestrator device 120, a VIM, and/or a NFVO); and implements repairs by, for example, switching over from a failed primary unit/system (e.g., primary hypervisor) to a secondary unit/system (e.g., secondary hypervisor) in virtualization layer 520 or vice-versa.

VM layer 530 may include logic that detects failures in a VM or container; generates a trap/message and forwards the trap/message to another network device (e.g., orchestrator device 120, a VIM, and/or a NFVO); and implements repairs by, for example, switching over from a failed primary unit/system (e.g., primary VM or primary container) to a secondary unit/system (e.g., secondary VM or secondary container) in VM layer 530 or vice-versa.

VNF layer 540 may include logic that detects a failure in a VNF and associated service chains; generates a trap/message and forwards the trap/message to another network device (e.g., orchestrator 120, VNFM, and/or NFVO); and implements repairs by, for example, switching over from a failed primary unit/system (e.g., a primary VNF) to a secondary unit/system (e.g., a secondary VNF) in VNF layer 540 or vice-versa.

Connection layer 550 may include logic that detects a failure in a connection and/or a session running over virtualized system 500 due to a failure beyond those in the layers below (e.g., any of layers 510-540); generates a trap/message and forwards the trap/message to another network device (e.g., orchestrator 120, NFVO, and/or); and switches over from a failed primary unit/system (a primary connection) to a secondary unit/system (e.g., a secondary connection) or vice-versa.

FIG. 5 illustrates exemplary layers of the virtualized system 500. In other implementations, layers of the virtualized system 500 may include fewer layers, different layers, differently arranged layers, or additional layers than depicted in FIG. 5. For example, in some implementations, virtualization layer 520 may be grouped with (or part of) INF-L1 510, a container may be used, a virtualization layer may be omitted, and so forth. Furthermore, service chaining among VNFs may be provided and managed by a VNFM device. According to such an exemplary implementation, the VNFM device may generate traps/messages for service chain failures and coordinate switchovers from failed primary systems to secondary systems or vice-versa. For failure recovery, if multiple layers are lumped into an aggregate layer such as INF-L1 210, then all the layers within a primary aggregate layer may be switched to a secondary aggregate layer at the same time.

Similarly, the AI-based self-fault and recovery management service may identify a probable cause of a failure and a possible recovery action for communication links 125 of network 110.

According to an exemplary implementation, an initial set of probable causes of failures and recovery actions may be configured. For example, an administrator may manually load known probable causes and recovery actions, or an ML system may be configured to identify an initial set of probable causes of failures and recovery actions. For example, the initial set may include the probable causes outlined in Consultative Committee for International Telephony and Telegraphy (CCITT) Rec. X.733 (1992) of the International Telegraph Union (ITU), which is incorporated by reference herein, or set forth in other known standards or sources.

According to an exemplary embodiment, the AI-based self-failure and recovery management service may generate and store AI-based self-failure and recovery information.

The AI-based self-failure and recovery information may include stored in various data structures (e.g., tables, etc.) or database. As described below, the AI-based self-failure and recovery information may include probable causes of failure information associated with nodes in a network. The representation of this information as described below is exemplary.

As illustrated below, there are a nodes vector, a probable cause vector, and a mapping matrix. According to this example, assume there are M nodes and L communication links.

$$\begin{pmatrix} Node\_1 \\ Node\_2 \\ Node\_3 \\ \cdot \\ \cdot \\ \cdot \\ Node\_M \end{pmatrix} \begin{bmatrix} 1 & 1 & 1 & \ldots & 0 \\ 0 & 0 & 0 & \ldots & 1 \\ 1 & 0 & 0 & \ldots & 1 \\ \cdot & \cdot & \cdot & \ldots & \\ \cdot & \cdot & \cdot & \ldots & \\ \cdot & \cdot & \cdot & \ldots & \\ 1 & \cdot & \cdot & \ldots & 0 \end{bmatrix} \begin{pmatrix} Nfl\_11 \\ Nfl\_12 \\ \vdots \\ Nfl\_1n \\ Nfl\_21 \\ \vdots \\ Nfl\_2r \\ \vdots \\ Nfl\_M1 \\ \vdots \\ Nfl\_Mk \end{pmatrix}$$

$$\text{Nodes Vector} \qquad \text{Mapping Matrix} \qquad \text{Probable Causes Vector}$$

The nodes vector indicates the nodes in the network, and the probable cause vector indicates probably causes of failures for a given node. For example, Nfl_ij is the jth probable cause of a failure of node i. The mapping matrix may indicate whether or not (e.g., values 0 or 1) the probable cause of the failure is applicable or not to the node.

The AI-based self-failure and recovery information may also include recovery information associated with the probable causes of failure information. As illustrated below, there are a probable cause vector, a recovery actions vector, and a mapping matrix.

$$\begin{pmatrix} Nfl\_11 \\ Nfl\_12 \\ \vdots \\ Nfl\_1n \\ Nfl\_21 \\ \vdots \\ Nfl\_2r \\ \vdots \\ Nfl\_M1 \\ \vdots \\ Nfl\_Mk \end{pmatrix} = \begin{bmatrix} 0 & 1 & 1 & \ldots & 0 \\ 0 & 1 & 0 & \ldots & 1 \\ 1 & 1 & 1 & \ldots & 0 \\ \cdot & \cdot & \cdot & \ldots & \\ \cdot & \cdot & \cdot & \ldots & \\ \cdot & \cdot & \cdot & \ldots & \\ 1 & \cdot & \cdot & \ldots & 1 \end{bmatrix} \begin{pmatrix} Nact\_11 \\ Nact\_12 \\ \vdots \\ Nact\_1n \\ Nact\_21 \\ \vdots \\ Nact\_2r \\ \vdots \\ Nact\_M1 \\ \vdots \\ Nact\_Mk \end{pmatrix}$$

$$\text{Probable Causes Vector} \qquad \text{Mapping Matrix} \qquad \text{Recovery Actions Vector}$$

The probable cause vector indicates probable causes of failures and the recovery actions vector indicates recovery actions. The mapping matrix may indicate whether or not (e.g., values 0 or 1), a recovery action is applicable or not to a probable cause of failure.

Similarly, with respect to the L communication links, probable causes of failures for communication link may be mapped to recovery actions, as illustrated below.

$$\begin{pmatrix} Lfl\_11 \\ Lfl\_12 \\ \vdots \\ Lfl\_1n \\ Lfl\_21 \\ \vdots \\ Lfl\_2r \\ \vdots \\ Lfl\_L1 \\ \vdots \\ Lfl\_Lk \end{pmatrix}_{\text{Probable Causes Vector}} = \begin{bmatrix} 1 & 1 & 0 & \ldots & 0 \\ 0 & 0 & 0 & \ldots & 1 \\ 1 & 0 & 1 & \ldots & 0 \\ \cdot & \cdot & \cdot & & \cdots \\ \cdot & \cdot & \cdot & & \cdots \\ \cdot & \cdot & \cdot & & \cdots \\ 0 & \cdot & \cdot & \ldots & 1 \end{bmatrix}_{\text{Mapping Matrix}} \begin{pmatrix} Lact\_11 \\ Lact\_12 \\ \vdots \\ Lact\_1n \\ Lact\_21 \\ \vdots \\ Lact\_2r \\ \vdots \\ Lact\_L1 \\ \vdots \\ Lact\_Lk \end{pmatrix}_{\text{Recovery Actions Vector}}$$

In relation to virtual network devices (e.g., virtual network devices 117), the probable causes of failure information may be associated with layers of a virtualized system. The nomenclature of layers, as used herein, is exemplary to indicate a virtualized component of a virtual network device. As illustrated below and referring to FIG. 5, there are a layers vector, a probable cause vector, and a mapping vector.

$$\begin{pmatrix} INFL1 \\ VL \\ VML \\ VNFL \\ CONNL \end{pmatrix}_{\text{Layers Vector}} = \begin{bmatrix} 0 & 1 & 0 & \ldots & 1 \\ 1 & 1 & 0 & \ldots & 0 \\ 0 & 0 & 1 & \ldots & 0 \\ \cdot & \cdot & \cdot & & \cdots \\ \cdot & \cdot & \cdot & & \cdots \\ \cdot & \cdot & \cdot & & \cdots \\ 0 & \cdot & \cdot & \ldots & 1 \end{bmatrix}_{\text{Mapping Matrix}} \begin{pmatrix} INFL1\_fl1 \\ INFL1\_fl2 \\ \vdots \\ INFL1\_flq \\ VL\_fl1 \\ \vdots \\ VML\_fl1 \\ \vdots \\ VNFL\_fl1 \\ \vdots \\ CONNL\_fl1 \\ \vdots \\ CONNL\_fls \end{pmatrix}_{\text{Probable Cause Vector}}$$

The layers vector indicates the layers of a virtualized network device in the network, and the probable cause vector indicates probable causes of failures for a given virtualized network device on a per layer basis. The mapping matrix may indicate whether or not (e.g., values 0 or 1) the probable cause of the failure is applicable or not to the layer.

Additionally, the probable causes of failures of a layer of the virtualized network device may be mapped to recovery actions, as illustrated below.

$$\begin{pmatrix} INFL1\_fl1 \\ INFL1\_fl2 \\ \vdots \\ INFL1\_flq \\ VL\_fl1 \\ \vdots \\ VML\_fl1 \\ \vdots \\ VNFL\_fl1 \\ \vdots \\ CONNL\_fl1 \\ \vdots \\ CONNL\_fls \end{pmatrix}_{\text{Probable Cause Vector}} = \begin{bmatrix} 1 & 1 & 0 & \ldots & 1 \\ 0 & 1 & 0 & \ldots & 0 \\ 1 & 0 & 1 & \ldots & 0 \\ \cdot & \cdot & \cdot & & \cdots \\ \cdot & \cdot & \cdot & & \cdots \\ \cdot & \cdot & \cdot & & \cdots \\ 1 & \cdot & \cdot & \ldots & 1 \end{bmatrix}_{\text{Mapping Matrix}} \begin{pmatrix} INFL1\_act1 \\ INFL1\_act2 \\ \vdots \\ INFL1\_actq \\ VL\_act1 \\ \vdots \\ VML\_act1 \\ \vdots \\ VNFL\_act1 \\ \vdots \\ CONNL\_act1 \\ \vdots \\ CONNL\_acts \end{pmatrix}_{\text{Recovery Actions Vector}}$$

According to an exemplary embodiment, the AI-based self-fault and recovery management service may include refining configured probable causes and recovery actions, and updating (e.g., adding new failures and new recovery actions relative to existing ones). For example, the AI-based self-fault and recovery management service may include using a ML model that learns new failure cases and recovery actions and adding this information to the AI-based self-failure and recovery information. Additionally, the ML model may include refining probable cause information, recovery action information, and/or the mapping information based on feedback information provided by the service. The refining may include determining, for example, whether the identification of the probable cause of the failure was correct, the recovery action was successful, and so forth.

Figure 6:
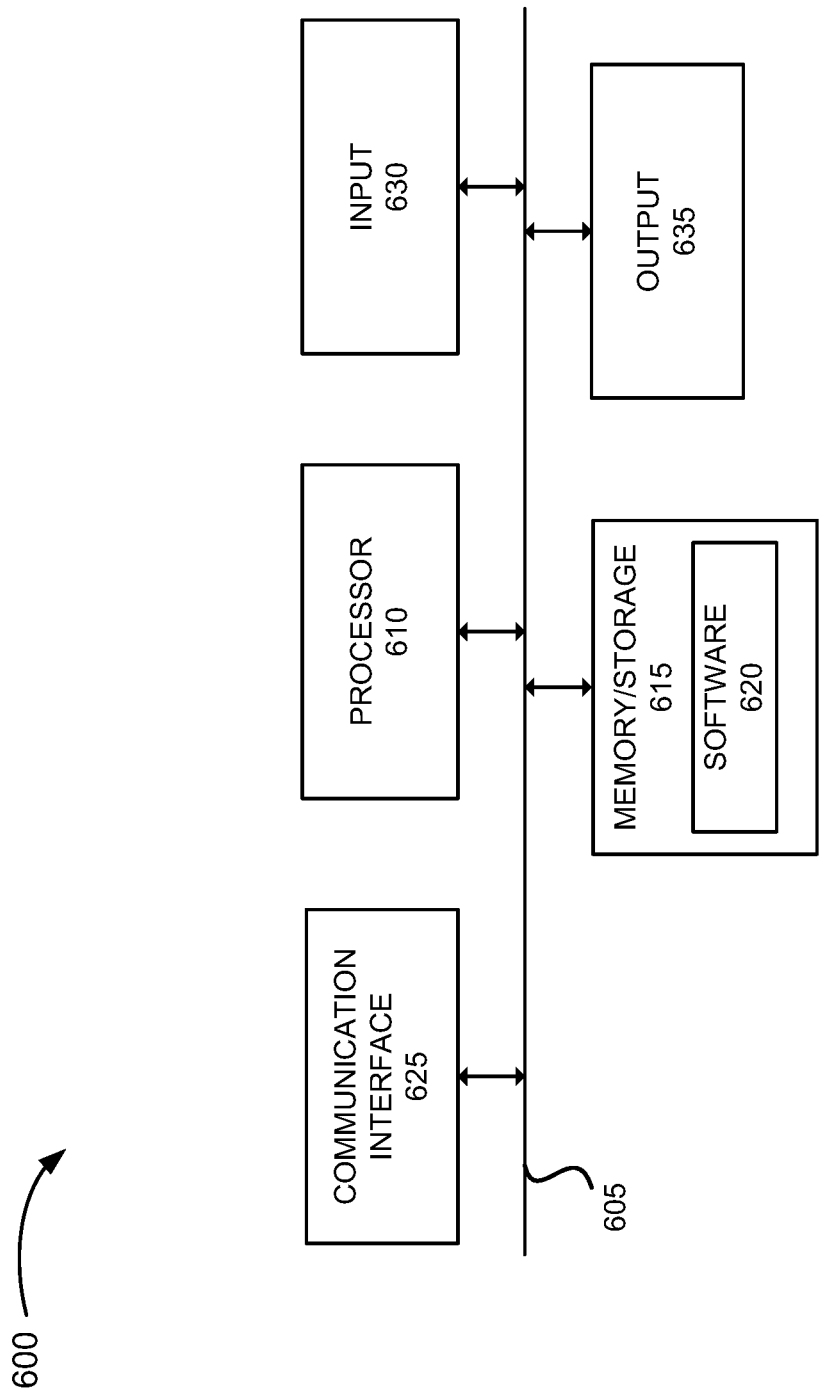
FIG. 6 is a diagram illustrating exemplary components of a device that may correspond to one or more of the devices illustrated and described herein.

FIG. 6 is a diagram illustrating exemplary components of a device 600 that may be included in one or more of the devices described herein. For example, device 600 may be included in network devices 115, virtual network devices 117, orchestrator device 120, end device 130, and other types of network devices or logic, as described herein. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, etc.

Memory/storage 615 includes one or multiple memories and/or one or multiple other types of storage mediums. For example, memory/storage 615 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. As an example, with reference to orchestrator device 120, software 620 may include an application that, when executed by processor 610, provides a function of the AI-based self-management network service, as described herein. Additionally, for example, with reference to network devices 115 and/or virtual network devices 117, software 620 may include an application that, when executed by processor 610, provides a function of the AI-based self-management network service. Software 620 may also include firmware, middleware, microcode, hardware description language (HDL), and/or other form of instruction. Software 620 may also be virtualized. Software 620 may further include an operating system (OS) (e.g., Windows, Linux, Android, proprietary, etc.).

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include an antenna. Communication interface 625 may include various processing logic or circuitry (e.g., multiplexing/de-multiplexing, filtering, amplifying, converting, error correction, application programming interface (API), etc.). Communication interface 625 may be implemented as a point-to-point interface, a service based interface, etc., as previously described.

Input 630 permits an input into device 600. For example, input 630 may include a keyboard, a mouse, a display, a touchscreen, a touchless screen, a button, a switch, an input port, speech recognition logic, and/or some other type of visual, auditory, tactile, etc., input component. Output 635 permits an output from device 600. For example, output 635 may include a speaker, a display, a touchscreen, a touchless screen, a light, an output port, and/or some other type of visual, auditory, tactile, etc., output component.

As previously described, a network device may be implemented according to various computing architectures and according to various network architectures (e.g., a virtualized function, etc.). Device 600 may be implemented in the same manner. For example, device 600 may be instantiated, created, deleted, or some other operational state during its life-cycle (e.g., refreshed, paused, suspended, rebooting, or another type of state or status), using well-known virtualization technologies (e.g., hypervisor, container engine, virtual container, VM, etc.) in a network.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a process and/or a function, as described herein. Alternatively, for example, according to other implementations, device 600 performs a process and/or a function as described herein based on the execution of hardware (processor 610, etc.).

Figure 7:
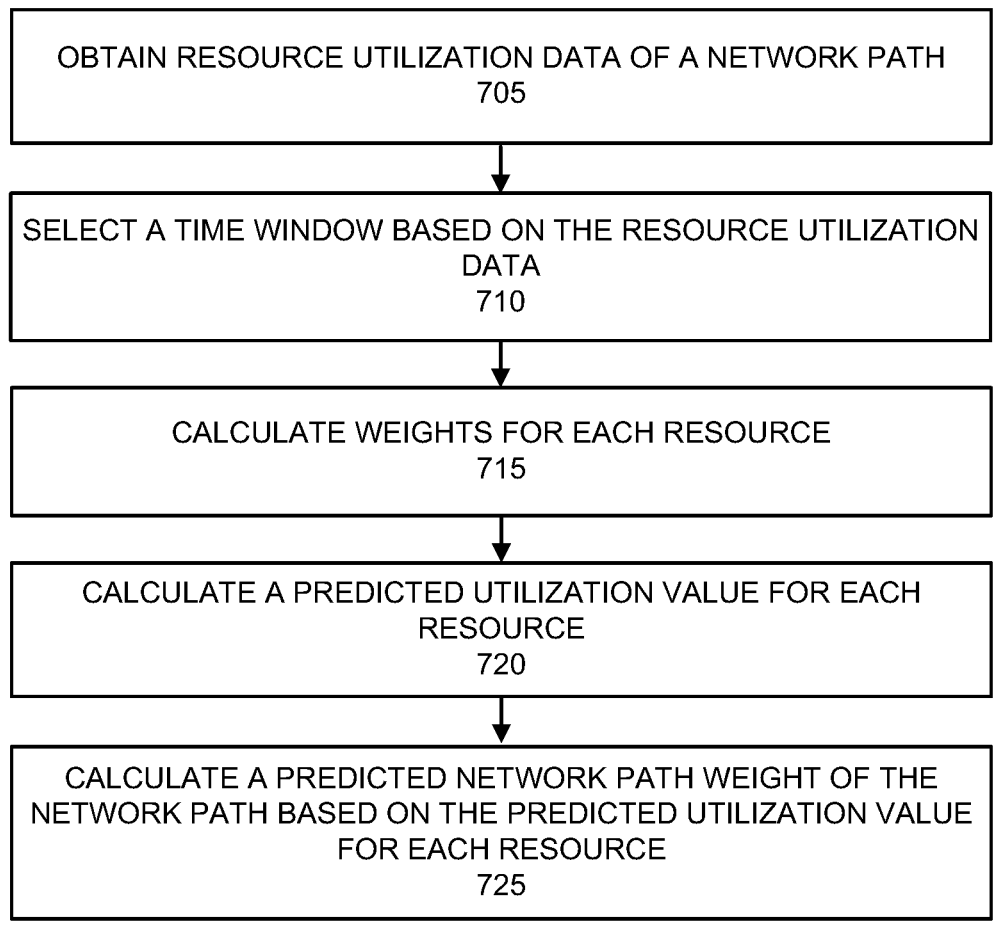
FIG. 7 is a flow diagram illustrating an exemplary process of an exemplary embodiment of the AI-based self-management network service.

FIG. 7 is a flow diagram illustrating an exemplary process 700 of an exemplary embodiment of the AI-based self-management network service. According to an exemplary embodiment, orchestrator device 120 may perform steps of process 700. According to other exemplary embodiments, another type of controller device for network devices 115 and/or virtualized network devices 117 may perform steps of process 700. According to an exemplary implementation, processor 610 may execute software 620 to perform a step illustrated in FIG. 7 and described herein. Alternatively, a step illustrated in FIG. 7 and described herein, may be performed by execution of only hardware.

Referring to FIG. 7, in block 705, orchestrator device 120 may obtain resource utilization data. For example, orchestrator device 120 may collect resource utilization data from network devices 115 and/or virtualized network devices 117 relevant to a network path. Orchestrator device 120 may also collect resource utilization data for communication link 125 relevant to the network path. Orchestrator device 120 may store the resource utilization data.

In block 710, orchestrator device 120 may select a time window to which the resource utilization data pertains. Orchestrator device 120 may select data points, within the time window, that were collected from measurements at specific times (e.g., every 5 minutes, every 10 minutes, every 15 minutes, etc.). Orchestrator device 120 may use the selected data within the time window for predicting the resource utilization value at a particular time t.

In one implementation, to predict a utilization value, orchestrator device 120 may apply machine learning logic to the selected data. The machine learning logic may use a mathematical relationship between resource utilization values $y_0, y_1, y_2 \ldots$ and $y_p$ and times $t_0, t_1, t_2 \ldots$ and $t_p$ at which the values were measured. The relationship may be expressed as:

$$y_r \cong y_0 + T_r^T \cdot W \quad (4),$$

where $y_0$ is an initial value of a resource, $y_r$ is a utilization value at time t, and $T_r$ and W are defined in expression (5) as:

$$T_r = \begin{bmatrix} t_1 \\ t_2 \\ \vdots \\ t_r \end{bmatrix} \text{ and } W = \begin{bmatrix} w_1 \\ w_2 \\ \vdots \\ w_r \end{bmatrix}.$$

In expression (4), W is an unknown vector being solved for and $T_r^T$ is a transpose of $T_r$. According to this exemplary implementation, the machine learning logic may solve for the values of W. To solve for W, for example, the Least Squares Cost function may be formed based on expression (4) as follows:

$$G(W) = \sum_{r=1}^{P}(y_0 + T_r^T W - y_r)^2 \quad (6)$$

The cost function G(W) can be minimized by selecting the weights W. To select the weights, solve:

$$\nabla G(W) = 0 \quad (7),$$

where $\nabla G(W)$ is the gradient of G(W). Taking partial derivatives of G(W) using expression (6) to obtain the gradient, and then using expression (7) yields:

$$\nabla G(W) = 2\sum_{r=1}^{p} T_r(y_0 + T_r^T W - y_r) = 0 \quad (8)$$

Expression (8) may be rewritten as:

$$\sum_{r=1}^{p} T_r y_0 + \sum_{r=1}^{p} T_r T_r^T W - \sum_{r=1}^{p} T_r y_r = 0 \quad (9)$$

In block 715, orchestrator device 120 may solve equation (9) to obtain W (i.e., values of $w_1, w_2 \ldots$ and $w_p$). Solving for W yields:

$$W = \left(\sum_{r=1}^{P} T_r T_r^T\right)^{-1} \left(\sum_{r=1}^{P} T_r y_r - \sum_{r=1}^{P} T_r y_0\right) \quad (10)$$

Once W is obtained, orchestrator device 120 may use a version of the following expression (11) to compute $y_t$. The expression is:

$$y_t \cong y_0 + T_t^T \cdot W \quad (11)$$

$T_t$ in expression (11) is defined as $T_r$ at $t_0 = t_1 = t_2 \ldots t_r = t$. That is:

$$T_t = \begin{bmatrix} t \\ t \\ \vdots \\ t \end{bmatrix}.$$

Using expression (11), orchestrator device 120 may predict the resource utilization $y_t$ at time t based on the data (block 720).

In the above, expressions (4)-(11) deal with the situation where the outputs are assumed to be linear. For a non-linear case, $$y_r \cong y_0 + F_r^T \cdot W, \quad (12)$$

where $F_r = \begin{bmatrix} f(t_1) \\ f(t_2) \\ \vdots \\ f(t_r) \end{bmatrix}$ and $W = \begin{bmatrix} w_1 \\ w_2 \\ \vdots \\ w_r \end{bmatrix}$ Each f(t) can be a sinusoidal function, such as $\sin(2\pi t_r)$. To solve for W, form the Least Squares Cost function based on expression (12) similarly as above:

$$G(W) = \sum_{r=1}^{p}(y_0 + F_r^T W - y_r)^2 \quad (13)$$

As before, find $\nabla G(W)$ by taking partial derivatives of G(W) and set it equal to zero to obtain:

$$\nabla G(W) = 2\sum_{r=1}^{p} F_r(y_0 + F_r^T W - y_r) = 0 \quad (14)$$

Expression (14) can be rewritten as:

$$\sum_{r=1}^{p} F_r y_0 + \sum_{r=1}^{p} F_r F_r^T W - \sum_{r=1}^{p} F_r y_r = 0 \quad (15)$$

Orchestrator device 120 may solve equation (15) to obtain W (i.e., values of $w_1, w_2 \ldots$ and $w_p$). Solving for W yields:

$$W = \left(\sum_{r=1}^{P} F_r F_r^T\right)^{-1} \left(\sum_{r=1}^{P} F_r y_r - \sum_{r=1}^{P} F_r y_0\right) \quad (16)$$

Once W is obtained, orchestrator device 120 may use a version of the following expression (17) to compute $y_t$. The expression is:

$$y_t \cong y_0 + F_t^T \cdot W \quad (17)$$

$F_t$ in expression (17) is defined as $F_r$ at $t_0 = t_1 = t_2 \ldots t_r = t$. That is:

$$F_t = \begin{bmatrix} f(t) \\ f(t) \\ \vdots \\ f(t) \end{bmatrix}.$$

In process 700, the predicted utilization $y_t$ depends on the resource utilization data (i.e., $y_0, y_1, y_2$, etc.) and the times at which the data were measured. For example, assume that the data measurements were performed 5 minutes apart (i.e., $t_0=0$, $t_1=5$, $t_2=10$ . . . in minutes). Orchestrator device 120 may then use the above expressions (4)-(11) to determine $y_t$ at t=20 minutes from the start. In another example, the time measurements may be one day apart (e.g., $t_1=1$, $t_2=2$ . . . in days). The data may be used to predict the resource utilization for the next 5 days. Other time intervals may be used (e.g., weekly, bi-weekly, monthly, quarterly, or some other configurable time period). For example, the resource utilization data may pertain to measurements performed every minute and sets of 5 minute or 10 minute (or any predetermined period) historical measurements (e.g., average resource utilization values, maximum resource utilization values, etc.) may be obtained. Orchestrator device 120 or another device may store such measurements for a certain time interval in a day (e.g., 9 a.m.-3 p.m., 3 p.m.-6 p.m., etc.). Orchestrator device 120 may use the measurements to predict resource use for the same time interval in another day.

In block 725, orchestrator device 120 may calculate a predicted network path weight of the network path based on the predicted utilization value for each resource. For example, based on expression (1) and the threshold values, as described herein, orchestrator device 120 may calculate the predicted network path weight.

FIG. 7 illustrates an exemplary process 700 of the AI-based self-management network service, however, according to other embodiments, process 700 may include additional operations and/or different operations than those illustrated in FIG. 7 and described herein. For example, orchestrator device 120 may provide the predicted network path weight to network devices 115 and/or virtual network devices 117, as previously described. Network devices 115 and/or virtualized network devices 117 may use the predicted network path weight value for routing and network path selections in support of traffic and/or other service decisions.

Figure 8:
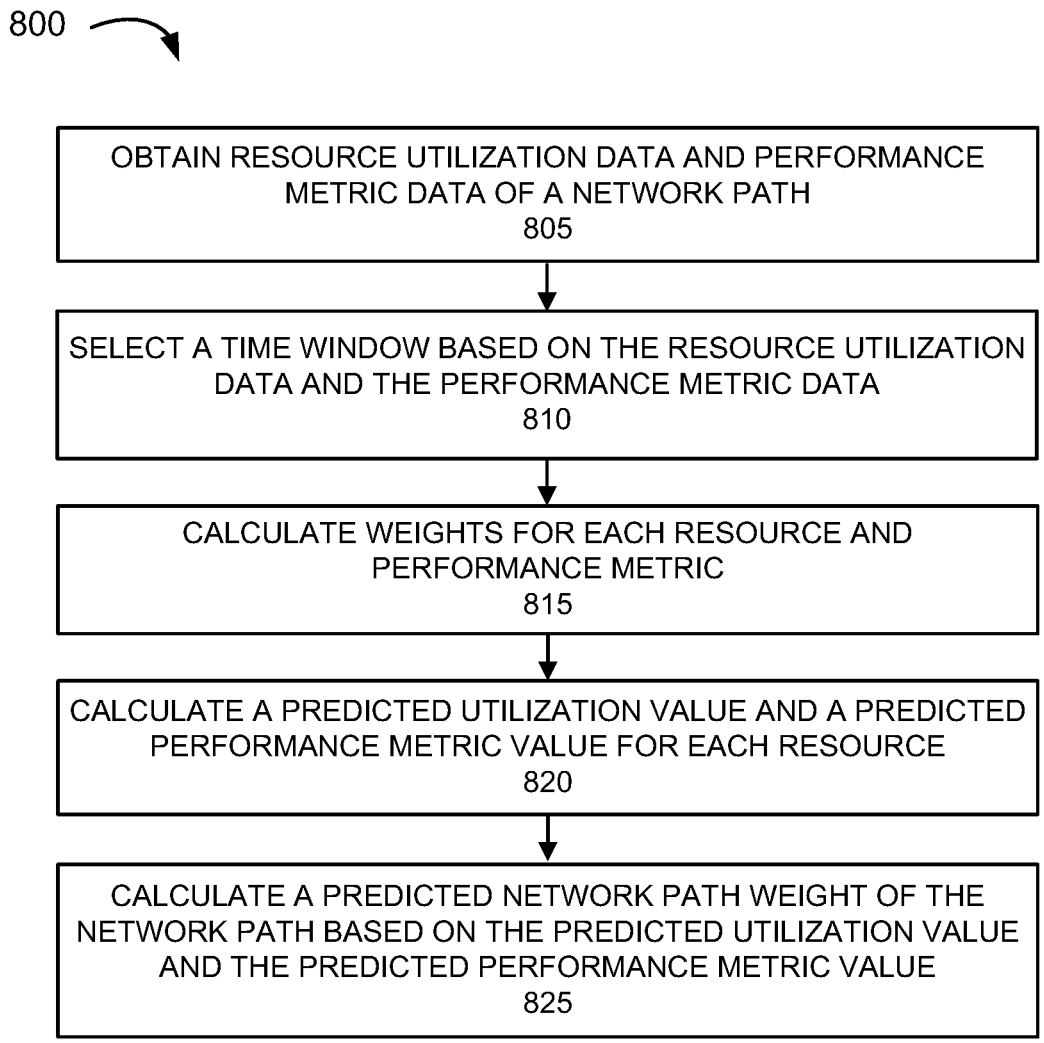
FIG. 8 is a flow diagram illustrating another exemplary process of an exemplary embodiment of the AI-based self-management network service.

FIG. 8 is another flow diagram illustrating another exemplary process 800 of an exemplary embodiment of the AI-based self-management network service. According to other exemplary embodiments, another type of controller device for network devices 115 and/or virtualized network devices 117 may perform steps of process 800. According to an exemplary implementation, processor 610 may execute software 620 to perform a step illustrated in FIG. 8 and described herein. Alternatively, a step illustrated in FIG. 8 and described herein, may be performed by execution of only hardware.

In contrast to process 700, in block 805, orchestrator device 120 may also obtain performance metric data of a network path. For example, the performance metric data may relate to delay, jitter, packet loss, and/or another type of metric as described herein. Orchestrator device 120 may perform operations similar to those described in blocks 710-720 for blocks 810-820 of FIG. 8. In block 825, orchestrator device 120 may calculate a predicted network path weight of the network device based on the predicted utilization value and one or multiple predicted performance metric values. For example, based on expressions (1), (2), (3), and the threshold values, as described herein, orchestrator device 120 may calculate the predicted network path weight. For example, orchestrator device 120 may provide the predicted network path weight to network devices 115 and/or virtual network devices 117, as previously described.

FIG. 8 illustrates an exemplary process 800 of the AI-based self-management network service, however, according to other embodiments, process 800 may include additional operations and/or different operations than those illustrated in FIG. 8 and described herein. For example, orchestrator device 120 may provide the predicted network path weight to network devices 115 and/or virtual network devices 117, as previously described. Network devices 115 and/or virtualized network devices 117 may use the predicted network path weight value for routing and network path selections in support of traffic and/or other service decisions.

Figure 9:
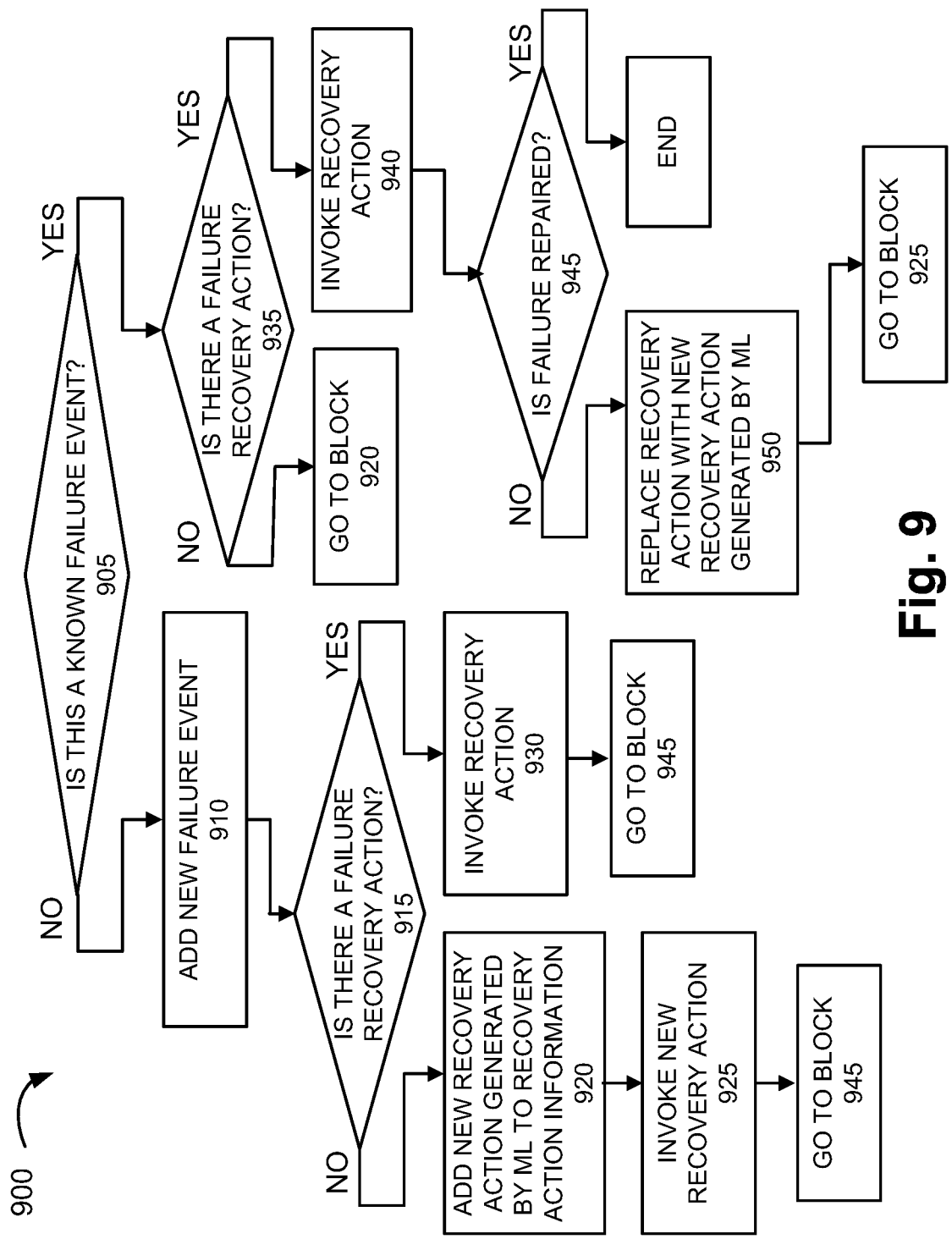
FIG. 9 is a flow diagram illustrating yet another exemplary process of an exemplary embodiment of the AI-based self-management network service.

FIG. 9 is a flow diagram illustrating yet another exemplary process 900 of an exemplary embodiment of the AI-based self-management network service. According to an exemplary embodiment, orchestrator device 120 may perform steps of process 900. According to other exemplary embodiments, another type of controller device for network devices 115 and/or virtualized network devices 117 may perform steps of process 900. According to an exemplary implementation, processor 610 executes software 620 to perform a step illustrated in FIG. 9 and described herein. Alternatively, a step illustrated in FIG. 9 and described herein, may be performed by execution of only hardware.

Assume in process 900 that orchestrator device 120 or another type of controller device has been notified of a failure event (e.g., via a message, etc.). Process 900 may be performed responsive to various failure events in relation to network devices and communication links, which may be virtual or non-virtual, as well as components and/or layers thereof. Additionally, process 900 may be performed in a centralized or distributed manner within a network.

Referring to FIG. 9, in block 905, it is determined whether a detected failure is known or not. For example, orchestrator device 120 may perform a look-up in the AI-based self-failure and recovery information to determine whether failure information matches the detected failure event.

When it is determined that the failure is not known (block 905), a new failure event may be added to the AI-based self-failure and recovery information (block 910). For example, orchestrator device 120 may generate probable cause information indicative of the new failure event.

In block 915, it is determined whether there is a recovery action (block 915). For example, orchestrator device 120 determine whether there is recovery action information for the new failure event (block 915). For example, orchestrator device 120 may perform a look-up in the AI-based self-failure and recovery information to determine whether there is recovery information correlated or mapped to this failure event.

When it is determined that there is not recovery action information for the new failure event (block 915—NO), a new recovery action may be generated by ML logic and added to the recovery action information (block 920). In block 925, the new recovery action may be invoked (block 925). When it is determined that there is a recovery action (block 915—YES), the recovery action may be invoked (block 930).

Referring back to block 905, when it is determined that the failure is known (block 905—YES), it is determined whether there is recovery action information for the failure (block 935). When there is a recovery action for the failure (block 935—YES), the recovery action may be invoked (block 940), and when there is not a recovery action (block 935—NO), process 900 may go to block 920.

As illustrated in FIG. 9, after a recovery action is invoked, in block 945, it is determined whether the failure is repaired. When it is determined that the failure is repaired (block 945—YES), process 900 may end. When it is determined that the failure is not repaired (block 945—NO), the recovery action may be replaced with a new recovery action generated by ML logic.

FIG. 9 illustrates an exemplary process 900 of the AI-based self-management network service, however, according to other embodiments, process 900 may include additional operations, fewer operations, and/or different operations than those illustrated in FIG. 9 and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 7, 8, and 9 the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 610, etc.), or a combination of hardware and software (e.g., software 620).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 610) of a device. A non-transitory storage medium includes one or more of the storage mediums described in relation to memory/storage 615. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
 obtaining, by a network device, resource utilization data of resources, which include first network devices and communication links of an end-to-end network path of a network including a radio access network, a core network, and an application layer network;
 selecting, by the network device, a time window based on the resource utilization data;
 calculating, by the network device, a weight for each resource pertaining to the resource utilization data associated with the time window based on a maximum utilization value for each resource of the end-to-end network path;
 calculating, by the network device, a predicted utilization value of each resource based on the weight;
 calculating, by the network device, a predicted network path weight value of the end-to-end network path based on the predicted utilization value for each resource including:
  comparing, by the network device, the predicted utilization value of each resource of the end-to-end network path to a threshold value;

determining, by the network device, whether the predicted utilization value of each resource satisfies the threshold value; and assigning, by the network device, the threshold value as the predicted network path weight value when the predicted utilization value of each resource satisfies the threshold value; and transmitting, by the network device, the predicted network path weight value to at least one of the first network devices that route traffic associated with end devices that are connected to the network based on the predicted network path weight value.

2. The method of claim 1, wherein the end-to-end network path includes multiple end-to-end network paths that are disjoint.

3. The method of claim 1, wherein the weight is calculated based on a direction of a communication along the end-to-end network path.

4. The method of claim 1, further comprising:
obtaining, by the network device, a performance metric value of the end-to-end network path; and
calculating, by the network device, a predicted performance metric value for each resource pertaining to the performance metric value.

5. The method of claim 4, wherein calculating the predicted network path weight value further comprises:
calculating, by the network device, the predicted network path weight value based on the predicted utilization value and the predicted performance metric value of the end-to-end network path.

6. The method of claim 4, wherein the performance metric value relates to at least one of delay, packet loss, or throughput.

7. The method of claim 1, wherein calculating the weight comprises:
calculating, by the network device, a gradient of a cost function for an unknown vector of weights.

8. The method of claim 1, wherein the resources include virtual and non-virtual hardware resources.

9. A network device comprising:
a processor configured to:
obtain resource utilization data of resources, which include first network devices and communication links of an end-to-end network path of a network including a radio access network, a core network, and an application layer network;
select a time window based on the resource utilization data;
calculate a weight for each resource pertaining to the resource utilization data associated with the time window based on a maximum utilization value for each resource of the end-to-end network path;
calculate a predicted utilization value of each resource based on the weight;
calculate a predicted network path weight value of the end-to-end network path based on the predicted utilization value for each resource including:
compare the predicted utilization value of each resource of the end-to-end network path to a threshold value;
determine whether the predicted utilization value of each resource satisfies the threshold value; and
assign the threshold value as the predicted network path weight value when the predicted utilization value of each resource satisfies the threshold value; and
transmit the predicted network path weight value to at least one of the first network devices that route traffic associated with end devices that are connected to the network based on the predicted network path weight value.

10. The network device of claim 9, wherein the end-to-end network path includes multiple end-to-end network paths that are disjoint.

11. The network device of claim 9, wherein the weight is calculated based on a direction of a communication along the end-to-end network path.

12. The network device of claim 9, wherein the processor is further configured to:
obtain a performance metric value of the end-to-end network path; and
calculate a predicted performance metric value for each resource pertaining to the performance metric value.

13. The network device of claim 12, wherein, when calculating the predicted network path weight value, the processor is further configured to:
calculate the predicted network path weight value based on the predicted utilization value and the predicted performance metric value of the end-to-end network path.

14. The network device of claim 12, wherein the performance metric value relates to at least one of delay, packet loss, or throughput.

15. The network device of claim 9, wherein, when calculating the weight, the processor is further configured to:
calculate a gradient of a cost function for an unknown vector of weights.

16. A non-transitory computer-readable storage medium storing instructions executable by a processor of a device, which when executed cause the device to:
obtain resource utilization data of resources, which include first network devices and communication links of an end-to-end network path of a network including a radio access network, a core network, and an application layer network;
select a time window based on the resource utilization data;
calculate a weight for each resource pertaining to the resource utilization data associated with the time window based on a maximum utilization value for each resource of the end-to-end network path;
calculate a predicted utilization value of each resource based on the weight;
calculate a predicted network path weight value of the end-to-end network path based on the predicted utilization value for each resource including:
compare the predicted utilization value of each resource of the end-to-end network path to a threshold value;
determine whether the predicted utilization value of each resource satisfies the threshold value; and
assign the threshold value as the predicted network path weight value when the predicted utilization value of each resource satisfies the threshold value; and
transmit the predicted network path weight value to at least one of the first network devices that route traffic associated with end devices that are connected to the network based on the predicted network path weight value.

17. The non-transitory computer-readable storage medium of claim 16, wherein the end-to-end network path includes multiple end-to-end network paths that are disjoint.

18. The non-transitory computer-readable storage medium of claim 16, wherein the instructions further comprise instructions, which when executed cause the device to:

obtain a performance metric value of the end-to-end network path; and calculate a predicted performance metric value for each resource pertaining to the performance metric value.

19. The non-transitory computer-readable storage medium of claim 18, wherein the instructions further comprise instructions, which when executed cause the device to:

calculate the predicted network path weight value based on the predicted utilization value and the predicted performance metric value of the end-to-end network path.

20. The non-transitory computer-readable storage medium of claim 16, wherein the resources include virtual and non-virtual hardware resources.

* * * * *